(12) United States Patent
Xiong (10) Patent No.: US 9,697,803 B2
(45) Date of Patent: Jul. 4, 2017

(54) METHOD AND APPARATUS TO REDUCE DISPLAY LATENCY OF TOUCH EVENTS USING IMAGE REPLICATIONS

(71) Applicant: SAMSUNG DISPLAY CO., LTD., Yongin, Gyeonggi-Do (KR)

(72) Inventor: Wei Xiong, Mountain View, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 62 days.

(21) Appl. No.: 14/749,437

(22) Filed: Jun. 24, 2015

(65) Prior Publication Data

US 2016/0004375 A1 Jan. 7, 2016

Related U.S. Application Data

(60) Provisional application No. 62/019,835, filed on Jul. 1, 2014.

(51) Int. Cl.
*G09G 5/377* (2006.01)
*G06F 3/0488* (2013.01)
*G06F 3/041* (2006.01)

(52) U.S. Cl.
CPC .......... *G09G 5/377* (2013.01); *G06F 3/0418* (2013.01); *G06F 3/04883* (2013.01); *G09G 2340/125* (2013.01); *G09G 2354/00* (2013.01); *G09G 2360/18* (2013.01)

(58) Field of Classification Search
CPC ....... G06F 3/0416; G06F 3/0486; G06F 3/048
See application file for complete search history.

(56) References Cited

U.S. PATENT DOCUMENTS

| 2010/0277429 | A1* | 11/2010 | Day | G06F 3/0416 345/173 |
| 2010/0277505 | A1 | 11/2010 | Ludden et al. | |
| 2011/0310118 | A1* | 12/2011 | Asmi | G06F 3/04883 345/619 |
| 2014/0204036 | A1 | 7/2014 | Schillings et al. | |

FOREIGN PATENT DOCUMENTS

KR 10-2014-0046905 A 4/2014

* cited by examiner

*Primary Examiner* — Kevin M Nguyen
(74) *Attorney, Agent, or Firm* — Lewis Roca Rothgerber Christie LLP (57) ABSTRACT

A method for providing visual feedback to touch input includes receiving a plurality of touch events from a touch sensor coupled to a display, generating an overlay segment based on the plurality of touch events, receiving a video frame, combining the video frame with the overlay segment in accordance with the touch events to generate a composite video frame, and supplying the composite video frame to the display.

20 Claims, 8 Drawing Sheets

METHOD AND APPARATUS TO REDUCE DISPLAY LATENCY OF TOUCH EVENTS USING IMAGE REPLICATIONS

CROSS-REFERENCE TO RELATED APPLICATION

This application claims priority to and the benefit of U.S. Provisional Application Ser. No. 62/019,835, filed Jul. 1, 2014, titled "A Method and Apparatus to Reduce Display Latency of Touch Events Using Image Replications," the entire content of which is incorporated herein by reference.

This application is also related to U.S. patent application Ser. No. 14/226,776, filed Mar. 26, 2014, titled "A Method and Apparatus to Reduce Display Lag Using Image Overlay," the entire content of which is incorporated herein by reference.

This application is additionally related to U.S. patent application Ser. No. 14/303,457, filed Jun. 12, 2014, titled "Method and Apparatus to Reduce Display Lag of Soft Keyboard Presses," the entire content of which is incorporated herein by reference.

BACKGROUND

1. Field

Embodiments of the present invention relate to display devices with touch input devices and, more specifically, systems and methods for reducing display lag between the touch input device and the display device.

2. Related Art

In recent years, touchscreen devices have become commonplace as personal mobile devices, such as mobile phones, tablets, laptops, and the like have gained in popularity. In addition to portable devices, touchscreens are being used in industry and in places such as cars and kiosks where keyboard-and-mouse systems do not allow fast, intuitive, or accurate interaction by the user with a display's content.

Touchscreen displays recognize user input by, for example, sensing touching (or tapping) of the screen, or by sensing a user's fingers or hand gestures in close proximity to the touchscreen. A touchscreen may be any surface onto which an image is projected, and from which a touch can be sensed.

Touch events detected by the touch sensor panels are typically processed by high level application software running on an application processor (AP) of the device. The many processing steps between the touch sensor panel and the AP and the non-deterministic processing time on the AP (including delays due to other computational tasks being performed by the AP, such as running the device's operating system and other applications) introduce high levels of latency (e.g., 70 to 100 milliseconds) that reduce responsiveness of the computing device to the user's touch inputs.

Some empirical studies have indicated that most humans can detect even a 30 millisecond asynchrony between senses, such as touch and vision (see, e.g., Keetels, M. and Vroomen, J. (2012). Perception of Synchrony Between the Senses. In M. M. Murray and M. T. Wallace (Eds.), Frontiers in the neural basis of multisensory processes (pp. 147-177). London: Taylor & Francis Group). Delays of 50 to 200 milliseconds would be detectable to most of users of these computing devices, which can lead to increased user frustration due to the failure of computing the device to immediately provide feedback to the user's input.

However, because the system processor also manages the other processes of the device (e.g., running the device's operating system and many other applications), response time required to update the appearance of the virtual keyboard can be slow, and there may be a noticeable lag between the time the user touches a key and the time that a visual feedback to the key press is provided to the user.

SUMMARY

Accordingly, aspects of embodiments of the present invention are directed to a method and apparatus for reducing the perceived response time of the display of a display device (e.g., a touchscreen device). Aspects of embodiments of the present invention do not require changes to an existing processor and/or operating system.

Aspects of embodiments of the present invention are directed to reducing the latency between a touch event and the display response to said touch event.

According to one or more embodiments of the present invention, there is provided a method for providing visual feedback to touch input, the method including: receiving a plurality of touch events from a touch sensor coupled to a display; generating an overlay segment based on the plurality of touch events; receiving a video frame; combining the video frame with the overlay segment in accordance with the touch events to generate a composite video frame; and supplying the composite video frame to the display.

In an embodiment, the video frame includes a displayed line, and wherein characteristics of the overlay segment match characteristics of the displayed line.

In an embodiment, the generating of the overlay segment includes: computing an estimated touch path based on locations of the touch events; determining a valid region of the video frames corresponding to the estimated touch path; comparing portions of the video frames corresponding to the valid region to determine differences in successive frames of the video frames; storing the differences in a memory buffer; and generating the overlay segment based on the stored differences, the overlay segment matching characteristics of the stored differences.

In an embodiment, the generating of the overlay segment based on the stored differences includes maintaining relative properties of pixels of the stored differences in the overlay segment.

In an embodiment, the relative properties include distances to local axes of movement along the estimated touch path, spatial separations between the pixels, and color gradients between the pixels.

In an embodiment, the generating of the overlay segment based on the stored differences includes shifting pixels of the stored differences to locations along the estimated touch path corresponding to a delay introduced by an application processor.

In an embodiment, the estimated touch path is computed based on a subset of the touch events corresponding to a fixed number of frames, and the fixed number of frames correspond to a delay introduced by an application processor.

In an embodiment, the combining the video frame with the overlay segment in accordance with the touch events includes: generating a mask based on the touch events, the mask including a matrix of numerical values, each of the numerical values identifying an operation to produce the composite video frame, wherein positions of the numerical values within the matrix correspond to positions of pixels in the composite video frame.

In an embodiment, the method further includes determining, for each pixel in the composite video frame, whether to output a corresponding pixel of the video frame or the overlay segment in accordance with a value in a corresponding position in the mask.

In an embodiment, each of the numerical values of the mask corresponds to one pixel in the composite video frame or corresponds to more than one pixel in the composite video frame.

In an embodiment, the touch events are generated as a result of an interaction between a pointing implement and touch sensor.

According to one or more embodiments of the present invention, there is provided an accelerator for providing visual feedback to touch input, the accelerator including: a processor; and a memory having instructions stored thereon that, when executed by the processor, cause the processor to perform: receiving a plurality of touch events from a touch sensor coupled to a display; generating an overlay segment based on the plurality of touch events; receiving a video frame; combining the video frame with the overlay segment in accordance with the touch events to generate a composite video frame; and supplying the composite video frame to the display.

In an embodiment, the generating of the overlay segment includes: computing an estimated touch path based on locations of the touch events; determining a valid region of the video frames corresponding to the estimated touch path; comparing portions of the video frames corresponding to the valid region to determine differences in successive frames of the video frames; storing the differences in a memory buffer; and generating the overlay segment based on the stored differences, the overlay segment matching characteristics of the stored differences.

In an embodiment, the generating of the overlay segment based on the stored differences includes maintaining relative properties of pixels of the stored differences in the overlay segment, and the relative properties include distances to local axes of movement along the estimated touch path, spatial separations between the pixels, and color gradients between the pixels.

In an embodiment, the generating of the overlay segment based on the stored differences includes shifting pixels of the stored differences to locations along the estimated touch path corresponding to a delay introduced by an application processor.

In an embodiment, the estimated touch path is computed based on a subset of the touch events corresponding to a fixed number of frames, and the fixed number of frames correspond to a delay introduced by an application processor.

In an embodiment, the combining the video frame with the overlay segment in accordance with the touch events includes: generating a mask based on the touch events, the mask including a matrix of numerical values, each of the numerical values identifying an operation to produce the composite video frame, wherein positions of the numerical values within the matrix correspond to positions of pixels in the composite video frame.

In an embodiment, the accelerator further includes determining, for each pixel in the composite video frame, whether to output a corresponding pixel of the video frame or the overlay segment in accordance with a value in a corresponding position in the mask.

According to one or more embodiments of the present invention, there is provided a touch input processing device for providing visual feedback to touch input, the touch-sensitive display device including: a display configured to display video frames; a touch sensor coupled to the display and configured to generate a plurality of touch events as a result of an interaction between a pointing implement and the touch sensor; a processor; and a memory having instructions stored thereon that, when executed by the processor, cause the processor to perform: receiving the plurality of touch events from the touch sensor; generating an overlay segment based on the plurality of touch events; receiving a video frame of the video frames; combining the video frame with the overlay segment in accordance with the touch events to generate a composite video frame; and supplying the composite video frame to the display.

In an embodiment, the executed instructions further cause the processor to perform receiving a video frame of the video frames from an application processor external to the touch-sensitive display device.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention allow a user to perceive a faster touch response by displaying an image based on the touch locations in advance of the application processor rendered image.

Software designed for touch interfaces often utilize a metaphor of direct physical manipulation of pseudo "real-world" objects and/or the drawing of paths on the screen to provide visual feedback (e.g., for the trace of a finger on a swiping or gesture-based on-screen keyboard, for the trace of a path in a drawing or sketchbook application, and for a path drawn in a game).

A common complaint of mobile devices is the lag of the user interface (UI). Current mobile devices may take 50 to 200 milliseconds to update the display in response to a touch action. For example, the typical display response time to a touch event on a mobile device may be more than 100 milliseconds or roughly over 6 frames of video images, based on a refresh rate of 60 frames per second (FPS), which is noticeable by a large portion of users.

Figure 1A:
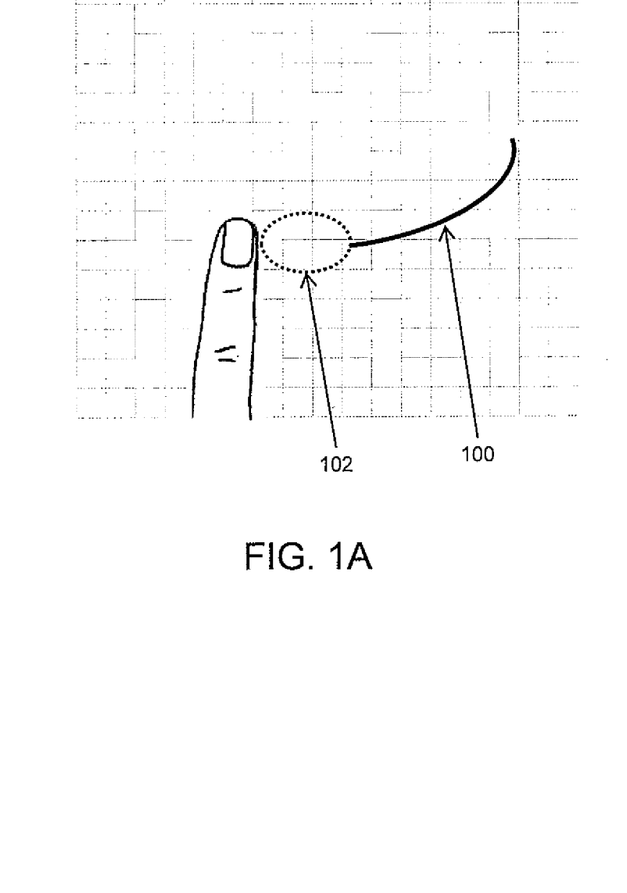
FIG. 1A illustrates the response of a device including a conventional touch input processing device.

FIG. 1A illustrates the response of a device including a comparable touch input processing device, where the displayed line 100 has a gap 102 between the position of a finger and the last drawn portion of the displayed line 100, thereby causing noticeable display lag between the user's touch and the displayed line. Similar display lag may also be encountered when using a stylus, whether active or passive.

Embodiments of the present invention allow the user to perceive a faster touch response by overlaying an image in the touch path in advance of the AP-rendered image. By closing the gap between the user's touch point (whether using a finger, stylus, or other implement) and the drawing of the line on the screen, the perceived display lag can be decreased. As used herein, the term "overlay" when used as a verb refers to combining video frames or images (e.g., an AP-rendered image or frame) and additional image data, such that the additional image data replaces (or "overlays") some portion of the original video frames, The term "overlay" when used as a noun may also refer to the appearance of that additional image data in the combined display image.

In addition, by using an overlay method, application software can also control the region (e.g., location on the display), color, and rendering operation of the displayed response to a touch event.

Figure 1B:
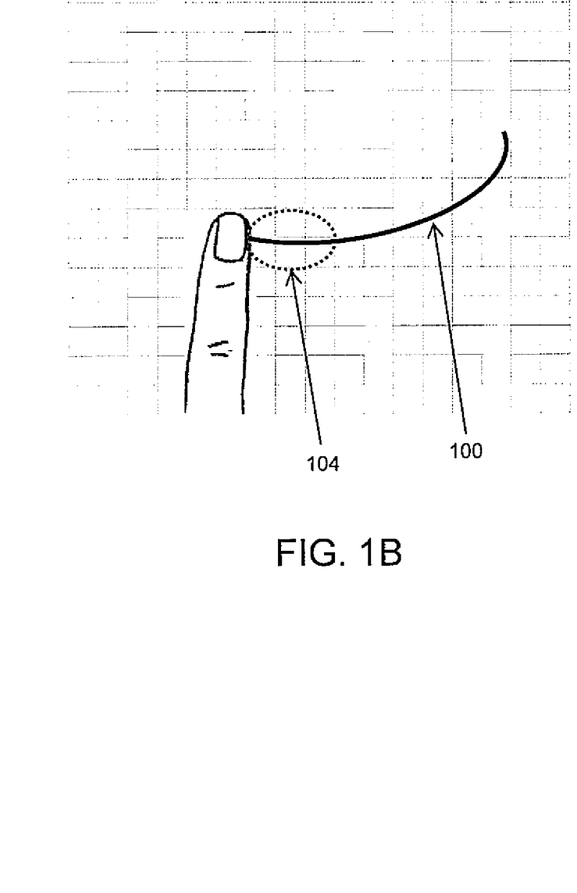
FIG. 1B illustrates the response of a device including a touch input processing device according to some exemplary embodiments of the present invention.

FIG. 1B illustrates the displayed response of a device including a touch input processing device according to exemplary embodiments of the present invention, where the displayed line includes an estimated or computed segment 104 that is drawn by a low-latency accelerator 300 according to exemplary embodiments of the present invention, thereby reducing the display lag perceived by the user.

Figure 2:
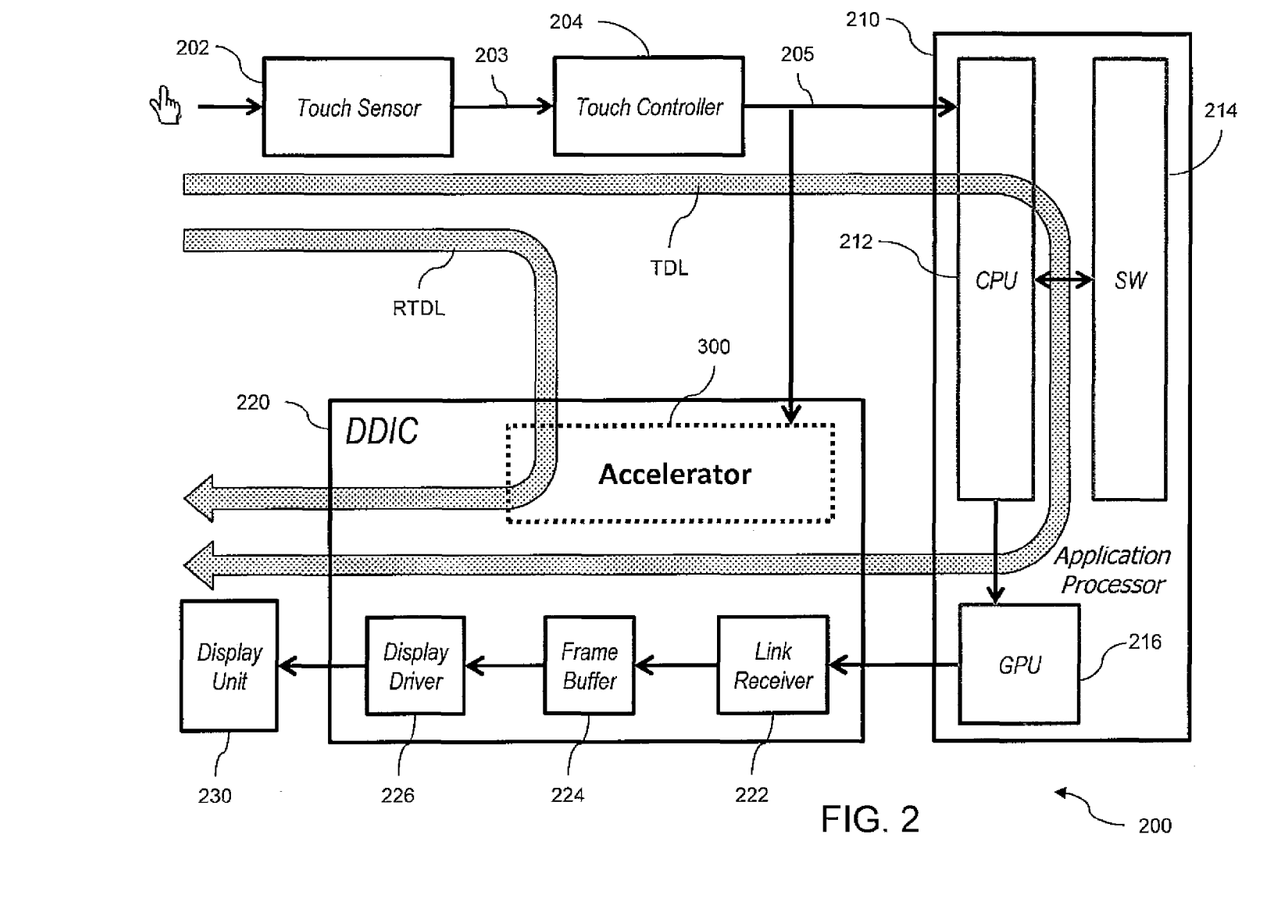
FIG. 2 is a schematic block diagram of a touch input processing device illustrating a conventional feedback path, and a reduced-latency feedback path according to exemplary embodiments of the present invention, from sensing a user touch event to updating the display screen to provide visual feedback to the user.

FIG. 2 is a schematic block diagram of a touch input processing device 200 according to exemplary embodiments of the present invention. FIG. 2 further illustrates a conventional feedback path (e.g., touch-to-display loop) TDL and a reduced-latency feedback path (e.g., reduced-latency touch-to-display loop) RTDL, according to exemplary embodiments of the present invention, from sensing a user touch event to updating the display screen to provide visual feedback to the user.

According to the present embodiment, a touch input processing device (e.g., touch-sensitive display device) 200 includes a touch sensor (e.g., a touch sensor panel) 202, a touch controller 204, an application processor (AP) 210, a display driver interface controller (DDIC) 220, and a display unit 230. The DDIC 220 may include a link receiver 222, a frame buffer 224, and a display driver (also referred to as a timing controller) 226. According to some embodiments, the DDIC 220 further includes an accelerator (also referred to as a visual feedback accelerator or a low-latency accelerator or overlay system) 300. In some embodiments of the present invention, the DDIC 220 may be integrated with the touch controller 204. The AP 210 may include a central processing unit (CPU) 212, application software (SW) 214, and a graphical processing unit (GPU) 216.

The touch sensor (e.g., a touch sensor panel or a touch screen) 202 detects a touch event, such a tap or a gesture, and sends corresponding touch signals 203 to the touch controller 204. Embodiments of the invention may utilize a touch sensor 202 that detects user's touch using any type of pointing implement, such as a body part (e.g., a finger), a stylus, etc. As used herein, the term "pointing implement" refers to objects that can be detected by a touch sensor 202 including devices (such as an active stylus and a passive stylus) and body parts (such as a finger or a hand). Embodiments of the present invention may utilize any of a variety of types of touch sensors such as resistive touch panels, surface acoustic wave touch panels, capacitive touch panels, infrared touch panels, optical touch panels, or the like. In some embodiments, touch signals 203 correspond to the raw data supplied by the touch sensor 202, such as measurements of capacitance or voltage or current for each location in the touch sensor 202. The data bus for the touch events 205 is connected to both the AP 210 and the low-latency accelerator 300. The touch events 205 may be a stream of data values corresponding to locations at which one or more touches by a user were detected (e.g., changes of capacitance or voltage or current of sufficiently high value to constitute the detection of a touch event). In some embodiments, the touch events 205 include pressure data indicating the pressure that was applied to the touch sensor 202.

The AP 210 processes the selection event, and the SW 214 running on the CPU 212 updates the display composition (e.g., information to be displayed by the display unit 230) accordingly. The GPU 216 processes the display composition and renders appropriate video frames (e.g., images to be displayed) to transmit to the DDIC 220 for displaying on the display unit 230. The transmitted signal received by the DDIC 220 may be in analog format and may be encoded, in which case, the link receiver 222 converts the transmitted analog signals from the AP 210 into image bits, decodes the bits, and generates video frames (e.g., video images). The video frames are then stored in a frame buffer 224 before being sequentially transmitted to display unit 230 for displaying to the user. The DDIC 220 may further include a pixel adjustment unit for performing gamma correction on the video frames prior to display. The pixel adjustment unit may adjust (e.g., enhance) the visual quality (e.g., brightness, gamma levels, etc.) of the video frames to correct for characteristics of the display unit (e.g., a display panel or an optical projector) 230. The display driver 226 includes circuitry for driving the individual pixels of the display unit 230 according to the adjusted video frames.

In some embodiments, the touch sensor 202, the touch controller 204, the DDIC 220, and the display unit 230 are all components of a display module, which may be separate from the application processor 210. In other embodiments, the touch sensor 202, the touch controller 204, the DDIC 220, and the display unit 230, or combinations thereof, may reside in separate modules, or be combined with the application processor 210.

Without the use of the accelerator 300 of the present embodiment, because of the long path from the user touch input to the display output (as represented by the feedback path TDL), a user may perceive a noticeable lag between the user's touch and the displayed video frame. This latency may, for example, be about 100 ms or longer, which may be perceived by a user. Part of the delay caused by the feedback path TDL may be attributed to the response time of the touch sensor 202 and the processing time of the touch controller 204, which is deterministic, and which may be about 20 ms or less. Furthermore, part of the delay may be attributed to the processing time of the AP 210, which is non-deterministic (e.g., about 60 ms to about 100 ms) as the CPU 212, at any given time, may or may not be busy running one or more higher priority processes.

By using an accelerator 300, embodiments of the present invention allow for a shorter touch-to-display path (as represented by the reduced-latency feedback path RTDL), which translates to reduced response lag or latency. For example, in contrast to the approximately 6 frames or more display lag in some comparable devices, embodiments of the present invention may reduce the lag to 1 to 2 frames.

In some embodiments of the present invention, the accelerator 300 may be enabled and/or disabled via an application software.

The accelerator 300 may be implemented as a separate component, or may be integrated into any one of the touch controller 204, AP 210, and/or the DDIC 220. For example, FIG. 2 depicts some embodiments in which the accelerator 300 is integrated with the DDIC 220.

Figure 3:
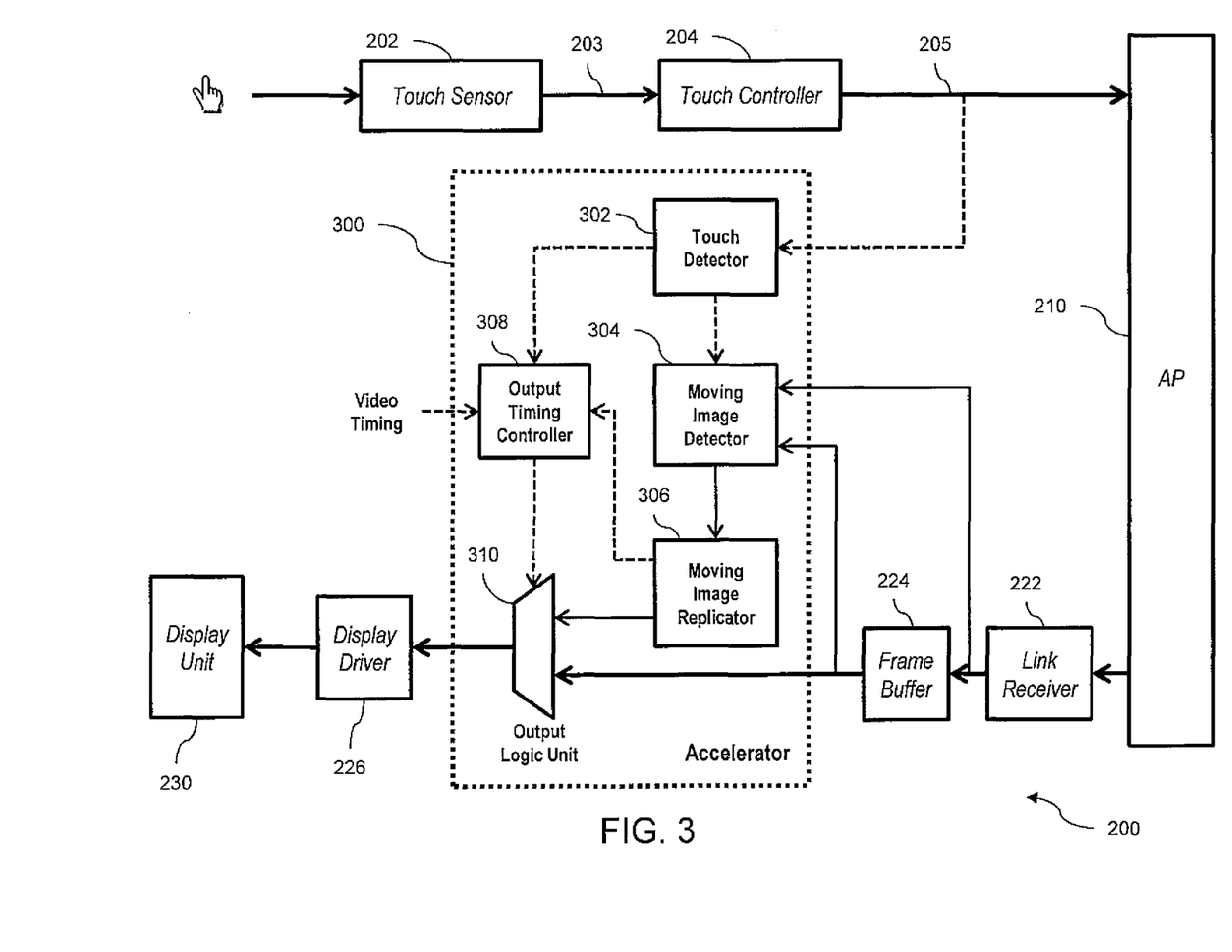
FIG. 3 is a schematic block diagram of a touch input processing device using an accelerator for reducing user-perceived display feedback latency, according to exemplary embodiments of the present invention.

FIG. 3 is a schematic block diagram of a touch input processing device 200 using an accelerator 300 for reducing user-perceived display feedback latency, according to exemplary embodiments of the present invention.

Referring to FIG. 3, paths of image flow between components are shown in solid pointer arrows, while control paths between components are shown with pointer arrows having dashed lines.

According to some embodiments of the present invention, the accelerator 300 includes a touch detector 302, a moving image detector 304, a moving image replicator 306, an output timing controller 308, and an output logic unit 310. The accelerator 300 may be included as a component of a DDIC 220, or portions of the accelerator 300 may be included in the DDIC 220 or an AP 210 and other portions may be included in a touch controller 204.

In some embodiments the touch detector 302 is connected to the touch controller 204 and receives touch events 205 from the touch controller 204. The touch detector 302 uses the locations of the touch events on the display unit 230 to determine a movement path (or an estimated touch path) of the user's finger or implement on or near the display unit 230. Based on the movement path, the touch detector 302 identifies a valid region (e.g., a relevant region) surrounding the movement path and supplies the valid region to the moving image detector 304 for further analysis.

In some embodiments, the moving image detector 304 is coupled to one or more of the link receiver 222 and the frame buffer 224 from which it receives the current rendered video frames (or video images) from the frame buffer 224 and the next rendered video frames from the link receiver 222. The moving image detector 304 compares the valid region of successive video frames to detect and store changes (or differences) in the video frames appearing in the valid region.

The moving image replicator 306 generates an overlay image segment based on the stored differences to fill in the gap between the location of the touch events and the current video frame rendered by the AP 210. The overlay image segment is a computed estimate of the difference between the video frame currently rendered by AP 210 and that, which would have been rendered had the AP 210 caught up with the current location of the touch event.

Using information provided by the moving image replicator 306, the output timing controller 308 determines, pixel by pixel, when the output logic unit 310 should output the rendered video frame (e.g., the most current rendered video frame) from the AP 210 or the overlay image segment.

Based on the control input from the output timing controller 308, the output logic unit 310 generates a composite image using the AP-rendered video frame and the overlay image segment. The output logic unit 310 then forwards the composite image to the display driver 226 to generate corresponding pixel drive signals to transmit to the display unit 230 to display the composite image to the user. In some embodiments, the DDIC 220 may further process the composite image produced by the output logic unit 310 before supplying it to the display driver 226. For example, the DDIC 220 may perform gamma correction on the composite image to correct for characteristics of the display unit 230.

Accordingly, the accelerator 300 may accelerate the visual feedback provided to the user (or reduce the user-perceived time lag in system response to a user touch) with the AP-rendered video frames as the only input from the AP 210. In some embodiments, the operations performed by the accelerator 300 may occur in a time span of less than one frame interval.

According to some embodiments, the touch detector 302, the moving image detector 304, the moving image replicator 306, the output timing controller 308, and the output logic unit 310 are each implemented using different application specific integrated circuits (ASICs). In other embodiments of the present invention, a single ASIC is used to implement all functions. In still other embodiments of the present invention, a field programmable gate array (FPGA) is programmed to perform the functions of each of the touch detector 302, the moving image detector 304, the moving image replicator 306, the output timing controller 308, and the output logic unit 310. Alternatively, a general purpose processor may be programmed (e.g., with instructions stored in memory connected to the general purpose processor) to perform the functions of each of the touch detector 302, the moving image detector 304, the moving image replicator 306, the output timing controller 308, and the output logic unit 310. In still other embodiments, the functionality of one or more of the touch detector 302, the moving image detector 304, the moving image replicator 306, the output timing controller 308, and the output logic unit 310 are implemented as components of the application processor 210.

Furthermore, although the touch detector 302, the moving image detector 304, the moving image replicator 306, the output timing controller 308, and the output logic unit 310 are shown in FIG. 3 as being components of the DDIC 220, embodiments of the present invention are not limited thereto. In some embodiments, one or more of the touch detector 302, the moving image detector 304, the moving image replicator 306, the output timing controller 308, and the output logic unit 310 (or components capable of performing these functions) are located within, for example, the touch controller 204, AP 210, or as a separate component. In addition, the components or the functions they perform may be located in different portions of the device. For example, the touch detector 302 may be implemented as a component or a function of the touch controller 204 and the moving image detector 304, the moving image replicator 306, the output timing controller 308, and the output logic unit 310 may be implemented as a component (or components) or a function (or functions) of the AP 210.

In addition, although the touch controller 204 is illustrated as a physically separate component, in some embodiments of the present invention the touch controller 204 is a portion of a larger integrated circuit. For example, the touch controller may be implemented in a same integrated circuit along with an AP 210 and/or a DDIC 220.

The operation of the accelerator 300 and its constituent components will be further described below with reference to FIGS. 4-7.

Figure 4A:
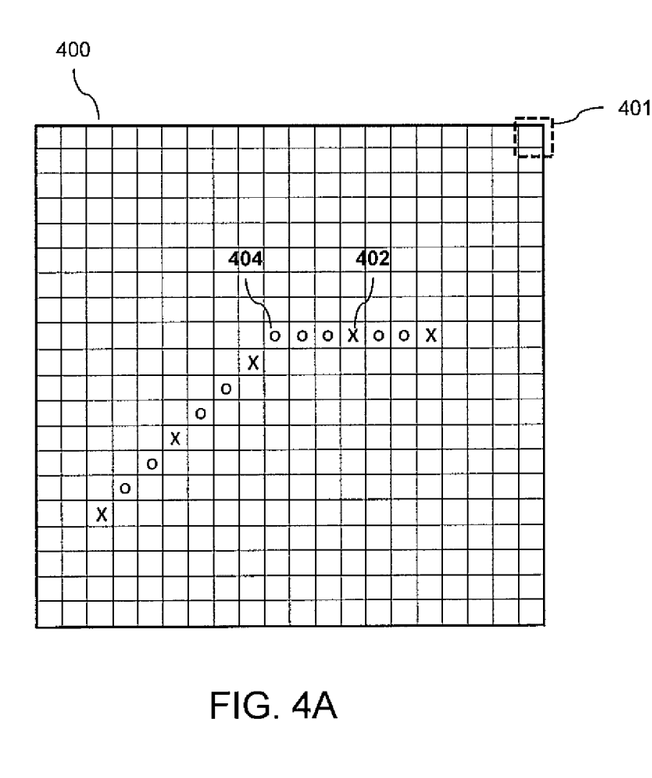
FIGS. 4A and 4B illustrate the process of interpolating a touch path and defining a valid region in a video frame by the accelerator according to exemplary embodiments of the present invention.
Figure 4B:
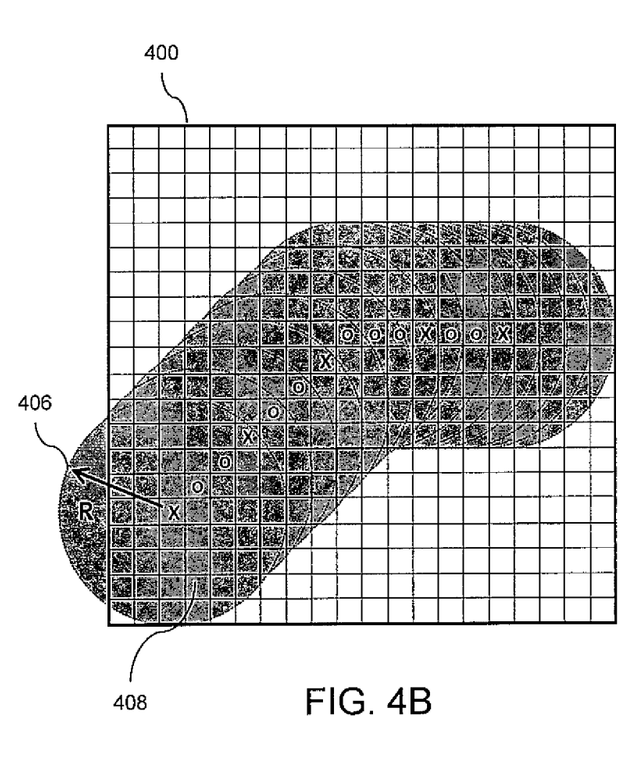

FIGS. 4A and 4B illustrate the process of interpolating a touch path and defining a valid region in a video frame by the accelerator 300 (e.g., touch detector 302) according to exemplary embodiments of the present invention.

According to some embodiments, the touch detector 302 receives locations of touch events from the touch controller 204 and maps the touch locations to the pixel locations in the video frame 400. As illustrated in FIGS. 4A and 4B, the touch locations 402 provided by the touch controller 204 (denoted as 'X's in FIGS. 4A and 4B) are discrete samples of a user's actual touch path, thus, consecutive touch locations 402 may be separated by several pixels. The touch detector 302 interpolates the touch locations 402 to construct a set of interpolated points 404 (denoted as 'O's in FIGS. 4A and 4B) to fill in the gaps between consecutive touch locations 402.

The touch detector 302 may utilize any one of a variety of suitable curve fitting algorithms to generate the interpolated points 404. For example, the interpolated points 404 may be a result of exact fits to the touch locations 402 or a smoothing operation performed by the touch detector 302. The interpolated touch points 404 may be along an estimated touch path, which is a computed estimate of the user's actual touch movement path. The estimated touch path may cross some or all of the touch locations 402 depending on the curve fitting algorithm used and the uncertainty in the location 402. The estimated touch path may be computed based on a subset of the touch events corresponding to a fixed number of frames, which is greater than or equal to a delay (in units of video frames) introduced by an application processor.

According to some embodiments, the touch detector 302 identifies a valid area 406 around each of the touch locations 402 and the interpolated points 404 (collectively referred to as "points" along the estimated touch path). The collection of valid areas 406 form the valid region 408, which designates a region around the estimated touch path that may be used by the moving image detector 304 to determine changes in successive frames. In some embodiments, the valid area 406 or valid region 408 may be set equal to the entire video frame 400. However, processing every pixel in every frame by the accelerator 300 may be computationally expensive and require substantial memory. Thus, to improve performance of the accelerator 300, embodiments of the present invention typically utilize valid areas 406 that constitute only a portion of the video frame. In some embodiments, the valid area 406 is a circle having a radius R (which may be rounded to a nearest pixel). In other embodiments, the valid area 406 is a square or rectangle having a side length rounded to the nearest pixel. In still other embodiments, the valid area 406 may be elliptical having lengths along its major and minor axes that are rounded to a nearest pixel. However, embodiments of the present invention are not limited thereto, and the valid area 406 may have any suitable shape. The dimensions of the valid area 406 may be determined based on, for example, the rate of movement (or speed) of the user's touch and the uncertainty in the touch locations 402. The rate of movement or speed may be determined by the distance (e.g., as measured by the number of pixels) between consecutive touch locations 402. The uncertainty in the touch locations 402 may be determined by the deviations between the touch locations 402 and the fitted curve used to generate the interpolated points 404. In some embodiments, as the rate of movement and/or the uncertainty increase, so does the size of the valid area 406 (e.g., the radius R of the circular valid area 406 may increase).

The valid region 408 tracks the user's touch movement, and, accordingly, may change shape as the user's touch moves along a movement path. In some embodiments, the number of valid areas 406 making up the valid region 408 (i.e., the length of the valid region 408) may be a fixed preset value. In other embodiments, the accelerator 300 may variably (or dynamically) set the length of the valid region 408 based on, for example, the system lag (e.g., as expressed in terms of number of video frames). In some embodiments, the length of the valid region 408 is a value greater than that representing the number of frames representing the system lag.

The video frame 400 illustrated in FIGS. 4A and 4B depicts a small number of pixels 401; however, this is only for ease of illustration, and as recognized by a person of ordinary skill in the art the number of pixels 401 making up a frame may be arbitrarily high and may only be limited by the technology used.

Figure 5A:
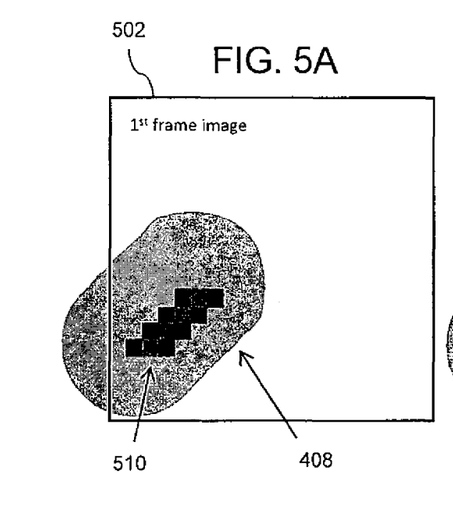
FIGS. 5A-5C illustrate three consecutive rendered video frames and the valid region tracking the touch path of the user's touch according to exemplary embodiments of the present invention.
Figure 5B:
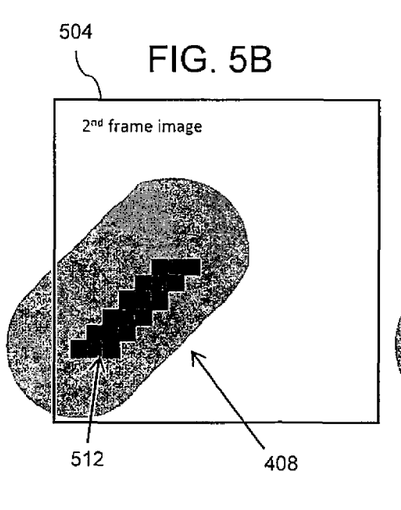
Figure 5C:
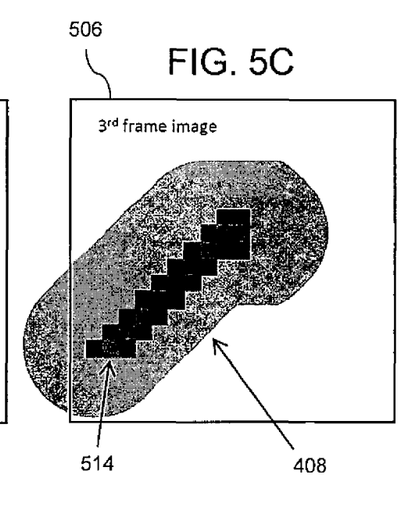
Figure 5D:
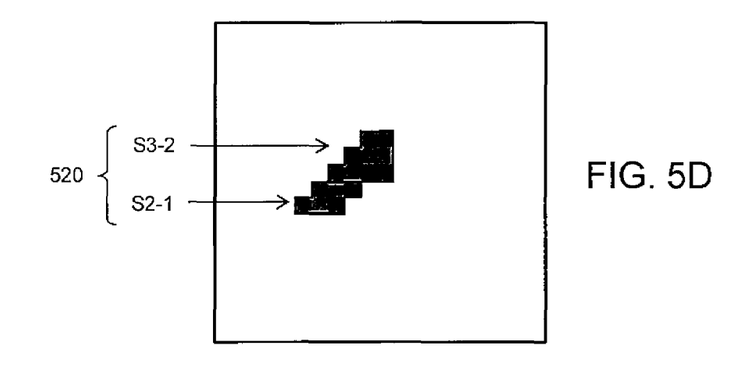
FIG. 5D illustrates image segments representing differences between consecutive video frames as recorded and stored by the accelerator, according to exemplary embodiments of the present invention.

FIGS. 5A-5C illustrate three consecutive rendered video frames 502, 504, and 506, and the valid region 408 tracking the movement path of the user's touch according to some embodiments of the present invention. FIG. 5D illustrates image segments representing the difference of the three consecutive video frames 502, 504, and 506 as recorded and stored by the accelerator 300 (e.g., moving image detector 304), according to exemplary embodiments of the present invention.

According to embodiments of the present invention, the moving image detector 304 analyzes the valid region 408 of successive video frames rendered by the AP 210 to detect any changes in the rendered video frames within the valid region 408. In some embodiments, the moving image detector 304 compares, within the valid region 408, the next video frame from the link receiver 222 to the current video frame received from the frame buffer 224 (operation 1). The moving image detector 304 then calculates the differences between the current and next video frames by, for example, subtracting, pixel by pixel; the current video frame from the next video frame (operation 2). The moving image detector then stores the calculated difference in a moving memory buffer (operation 3). The outlined process (operations 1-3) may repeated at least N times, where N represents the expected latency between the user touch input and the AP-generated display response in units of frames. In some examples, N is in a range of 4 to 10, but may typically be 7. In some embodiments, N is a preset fixed number based on empirical performance data of the display apparatus. In other embodiments, the number N may be dynamically adjusted by the accelerator 300 based on variations in latency as measured by the accelerator 300 over time.

FIGS. 5A-5D illustrate an example in which embodiments of the present invention are used in the context of a software application for drawing (e.g., a digital sketchbook). In such an example, the valid region 408 may represent an active drawing area in which a line is being drawn. Line segments 510, 512, and 514 represent moving images of a line as rendered by the AP 210 in a first video frame 502, second video frame 504, and third video frame 506, respectively. Referring to FIG. 5D, the first image segment S2-1 represents the difference between the second and first video frames 504 and 502, and the second image segment S3-2 represents the difference between the third and second video frames 506 and 504. The moving image detector 304 stores the first and second image segments S2-1 and S3-2 in a moving buffer (collectively referred to as stored or computed segment 520), which may be internal to the accelerator 300 (e.g., internal to the moving image detector 304). At any given time, the moving buffer may store N−1 image segments that represent the differences in valid regions of N consecutive frames, where N represents the expected latency between the user touch input and the AP-generated display response in units of frames. However, embodiments of the present invention are not limited thereto and the moving buffer may store N or more image segments.

For ease of illustration, in FIGS. 5A-5C, the valid region 408 is shown as being static while the AP 210 advances through rendering the drawn line; however, in practice, the valid region 408 may change from frame to frame in order to properly track the touch motion.

Figure 6:
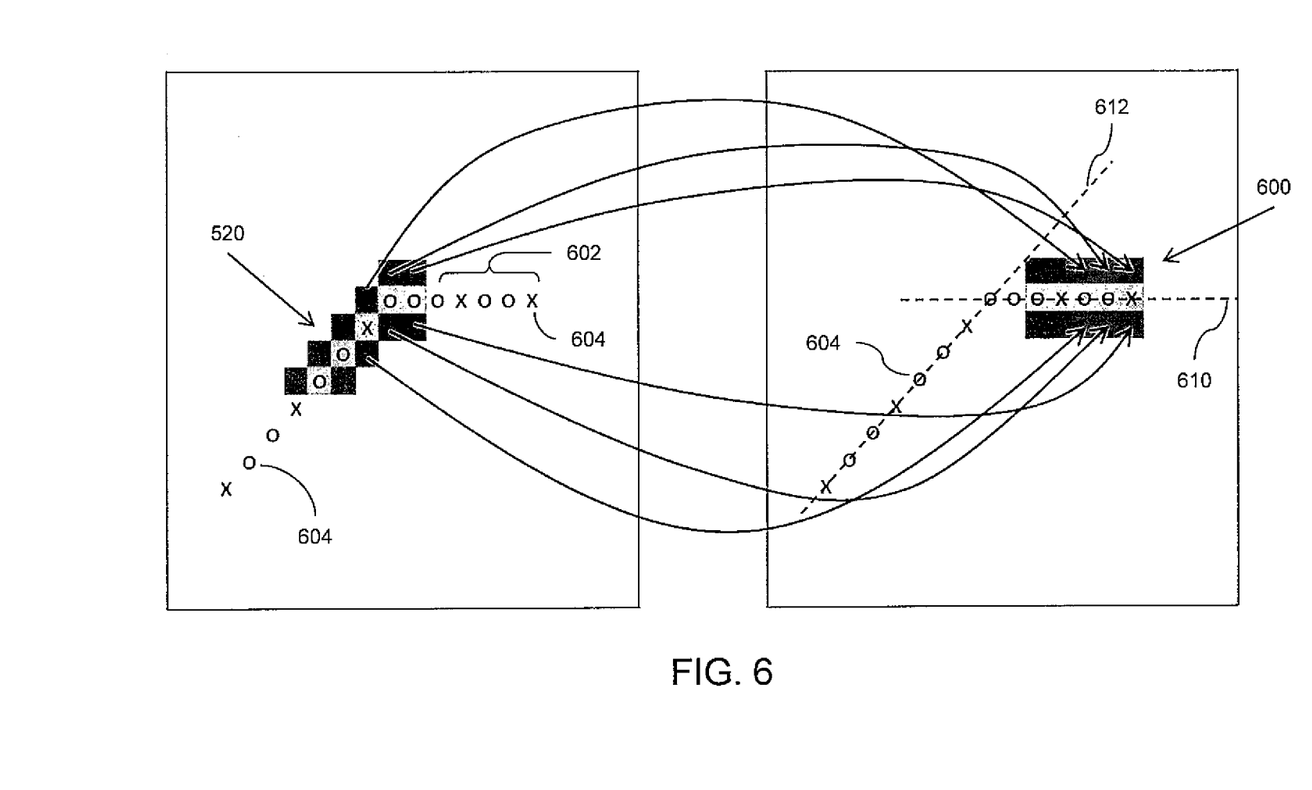
FIG. 6 illustrates the process of replicating, by the accelerator, stored pixels to fill in gaps between the user's touch point and the video frame rendered by an application processor, according to exemplary embodiments of the present invention.

FIG. 6 illustrates the process of replicating, by the by the accelerator 300 (e.g., moving image replicator 306), stored pixels to fill in gaps between the user's touch point and the AP-rendered video frame, according to exemplary embodiments of the present invention.

In some embodiments, the moving image replicator 306 generates (e.g., extrapolates) an overlay segment (e.g., an overlay image segment or a replicated image segment) using the stored segment 520 to cover the gap 602 along the movement path. The gap 602 includes touch points (whether actual touch locations using a finger, stylus, or other implement, or interpolated points) 604 along the movement path for which the AP 210 has not yet rendered a corresponding image (e.g., has not caught up with drawing a line on the screen).

While generating the overlay segment 600, the moving image replicator 306 maintains the relative properties of the pixels of the stored segment 520. The relative properties may include the distances of pixels to the axis of movement, spatial separations between pixels, color gradients between pixels, and the like. In some embodiments, the moving image replicator 306 performs a one-to-one mapping of the pixels of the stored segment 520 to the overlay segment 600. For example, as illustrated in FIG. 6, the moving image replicator 306 may shift pixels, from the stored segment, around an (I)th touch point 604 (where I is an integer greater than zero) to corresponding pixels around an (I+M)th touch point 604 (where M is an integer greater than or equal to N). The corresponding pixels around the (I+M)th touch point 604 (i.e. the shifted pixels) may have a relative distance (in units of pixels) to a local movement axis 610 at the (I+M)th touch point 604 that is the same as the relative distance of said pixels from the stored difference segment 520 (i.e., the stored difference pixels) to a local movement axis 612. The shifted pixel may have the same color characteristics (e.g., same color) as the stored difference pixel.

While some embodiments of the present invention utilize a pixel shift approach, embodiments of the present invention are not limited thereto and any one of the numerous image processing algorithms known to a person of ordinary skill in the art, or combinations thereof, can be used during the generation process (e.g., replication process) of the overlay segment 600.

Figure 7:
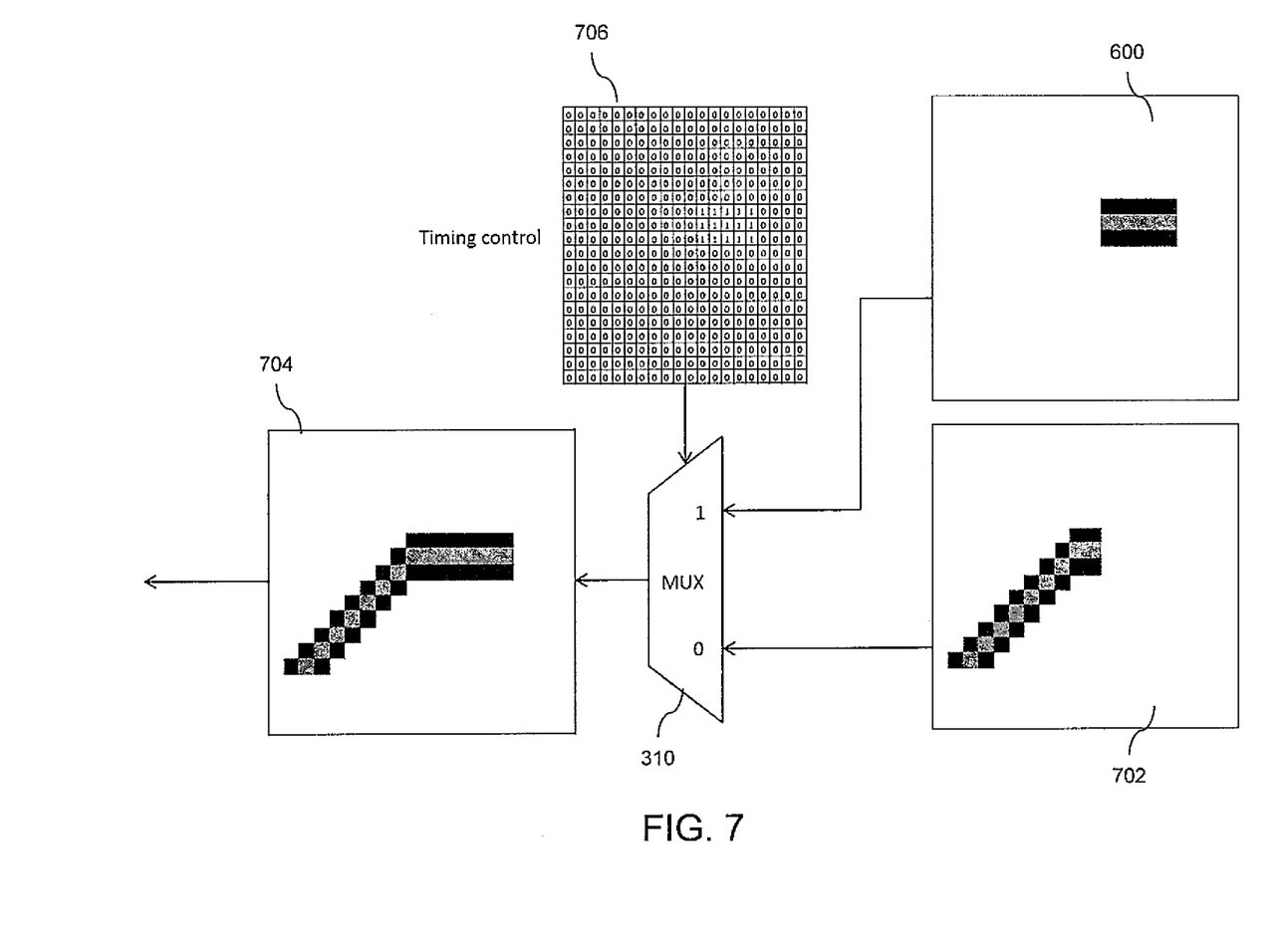
FIG. 7 is a schematic illustration of the combination of the overlay segment and the current video frame to generate a composite video frame according to exemplary embodiments of the present invention.

FIG. 7 is a schematic illustration of the combination of the overlay segment 600 and the current video frame 702 to generate a composite video frame (e.g., composite frame image) 704 according to exemplary embodiments of the present invention.

In some embodiments, the output timing controller 308 generates a mask 706 to determine, pixel by pixel, when the output logic unit 310 outputs the current AP-generated video frame 702 from the frame buffer 224 or the overlay segment 600 from the moving image replicator 306. The determination may be based on the video timing, pixel locations on the movement path from the touch detector 302, and the pixel locations of the overlay segment 600. The output logic unit 310 uses the mask 706 to combine the overlay segment 600 with the current video frame 702 to generate the composite video frame 704 by selecting between the overlay segment 600 and the current video frame 702.

According to some embodiments, the mask 706 is a matrix of numerical values, wherein a position in the matrix corresponds to a position of a pixel (or pixels) in the display unit 230 and wherein the relative positions of the values in the matrix correspond to the relative positions of the pixels in the display unit 230 (e.g., the mask 706 may be thought of as a two-dimensional matrix corresponding to a two-dimensional map of the pixel positions in the composite video frame 704). Thus there is a one-to-one relationship between each value in the mask 706 and the pixel of each of the current and composite video frames 702 and 704.

According to some embodiments, each of the values of the mask 706 is represented as a single bit, and the positions of the values in the mask matrix correspond to positions in the composite video frame 704. Positions where the overlay segment 600 are to be shown in the composite video frame 704 have the values set to a first value (e.g., "1") and positions where the overlay data are not to be shown (e.g., where the current video frame 702 is to be shown) have values set to a second, different value (e.g., "0"). In some examples, each of the numerical values of the mask 706 corresponds to exactly one pixel in the composite video frame 704 or corresponds to more than one pixel in the composite video frame 704.

In some embodiments, the output logic unit 310 operates as a multiplexer outputting either the current video frame 702 or the overlay segment 600 for each pixel based on the value at the position in the mask 706 corresponding to the position of the pixel in the composite video frame 704. In other words, the output logic unit 310 matches each value in the mask 706 to a corresponding pixel in the current video frame 702 and outputs either the pixel of the current video frame 702 or the overlay segment 600 to the display unit 230. In some embodiments, the output logic unit 310 iterates through each value of the mask 706. If a value of 0 exists at a particular position in the mask 706, then the output logic unit 310 outputs the corresponding pixel of the current video frame 702. On the other hand, if a value of 1 exists at a particular position in the mask 706, then the output logic unit 310 outputs the overlay segment 600. As a result of the iterative process, the output logic unit 310 outputs the composite video frame 704 to the display unit 230. The speed at which the iterative process is executed by the accelerator 300 is controlled by the video timing.

Figure 8:
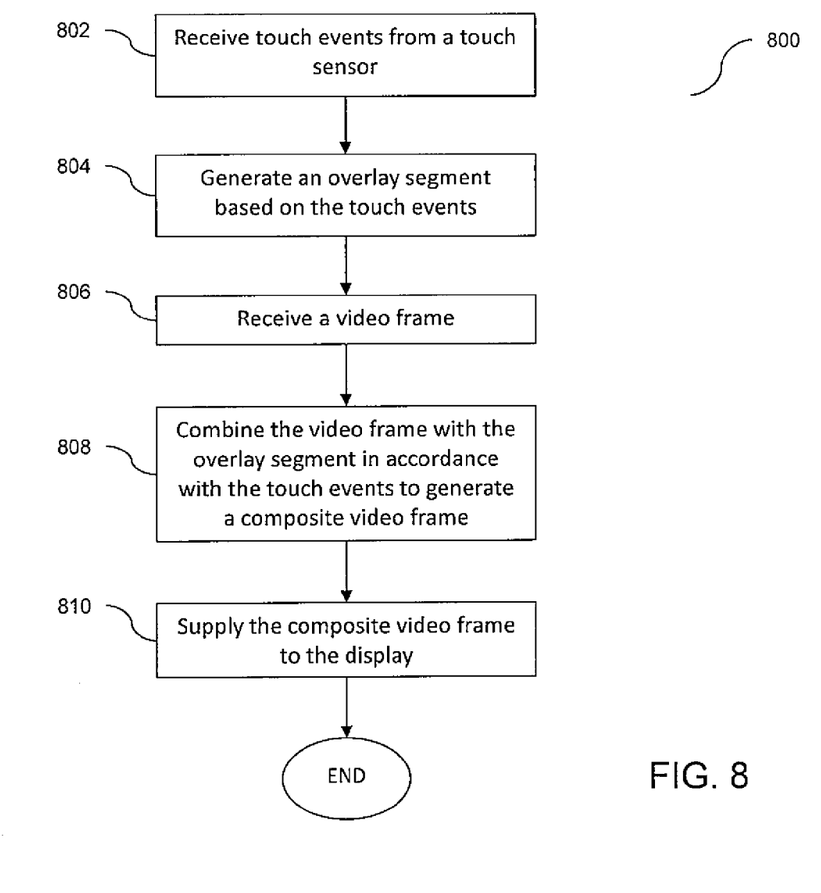
FIG. 8 is a flow diagram of a process for providing visual feedback to touch input according to exemplary embodiments of the present invention.

FIG. 8 is a flow diagram of a process 800 for providing visual feedback to touch input according to exemplary embodiments of the present invention.

In some embodiments, in operation 802, the accelerator 300 (e.g., the touch detector 302) receives a plurality of touch events from a touch controller 204 coupled to a touch sensor 202. The touch events may be generated by the touch controller 204 as a result of an interaction between a pointing implement (e.g., a user finger, a stylus pen, etc.) and the touch sensor 202.

In operation 804, the accelerator 300 (e.g., the moving image replicator 306) generates the overlay segment 600 based on the received touch events. In some embodiments, the accelerator 300 (e.g., the moving image detector 304) computes an estimated touch path based on locations of the touch events and determines a valid region 408 in video frames corresponding to the estimated touch path. The accelerator 300 (e.g., the moving image replicator 306) compares the video frames to determine differences (e.g., S2-1 and S3-2) in successive frames of the video frames, and stores the differences 520 in a memory buffer. The overlay segment 600 may match the characteristics of the stored difference segment 520. For example, the accelerator 300 (e.g., the moving image replicator 306) may maintain the relative properties of pixels of the stored difference segment 520 in the overlay segment 600. The relative properties may include distances to local axes of movement along the estimated touch path, spatial separations between the pixels, and color gradients between the pixels. In some embodiments, the accelerator 300 (e.g., the moving image replicator 306) shifts pixels of the stored difference segment 520 to locations along the estimated touch path corresponding to a delay introduced by the AP 210.

In operation 806, the accelerator 300 (e.g., the output logic unit 310) receives the current video frame 702 from the frame buffer 224 to combine with the overlay segment 600.

In operation 808, the accelerator 300 (e.g., the output logic unit 310) combines the current video frame 702 with the overlay segment 600 in accordance with the touch events to generate a composite video frame 704. In some embodiments, the accelerator 300 (e.g., the output timing controller 308) generates a mask 706 based on the touch events. The mask includes a matrix of numerical values (e.g., '0's and '1's), which identify an operation to produce the composite video frame. The positions of the numerical values within the matrix may correspond to positions of pixels in the composite video frame 704. The accelerator 300 (e.g., the output logic unit 310) determines, for each pixel in the composite video frame 704, whether to output a corresponding pixel of the current video frame 702 or the overlay segment 600 in accordance with a value in a corresponding position in the mask 706.

In operation 810, the accelerator 300 (e.g., the output logic unit 310) supplies the composite video frame 704 to the display unit 230 (via the display driver 226). The accelerator 300 may perform further processes on the composite video frame 704 before outputting the resulting frame to the display driver 226.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. §112, first paragraph, and 35 U.S.C. §132(a).

The display apparatus and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display apparatus may be formed on one integrated circuit (IC) chip or on separate IC chips. Further, the various components of the display apparatus may be implemented on a flexible printed circuit film, a tape carrier package (TCP), a printed circuit board (PCB), or formed on a same substrate as the display apparatus. Further, the various components of the display apparatus may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this disclosure has been described in connection with what is presently considered to be practical exemplary embodiments of the present invention, it is to be understood that the present invention is not limited to the disclosed embodiments, but, on the contrary, is intended to cover various suitable modifications and equivalent arrangements included within the spirit and scope of the appended claims and their equivalents.

What is claimed is:

1. A method for providing visual feedback to touch input, the method comprising:
   receiving a plurality of touch events from a touch sensor coupled to a display;
   generating an overlay segment based on the plurality of touch events;
   receiving a video frame of the video frames;
   combining the video frame with the overlay segment in accordance with the touch events to generate a composite video frame; and
   supplying the composite video frame to the display,
   wherein the generating of the overlay segment comprises:
      determining a valid region of the video frames surrounding an estimated touch path;
      comparing portions of rendered video frames of the video frames corresponding to the valid region to determine differences in successive rendered frames of the video frames; and
      generating the overlay segment based on the differences in the successive rendered frames, the overlay segment matching characteristics of the differences in the successive rendered frames.

2. The method of claim 1,
   wherein the video frame comprises a displayed line, and
   wherein characteristics of the overlay segment match characteristics of the displayed line.

3. The method of claim 1, wherein the generating of the overlay segment further comprises:
   computing the estimated touch path based on locations of the touch events; and
   storing the differences in a memory buffer, and
   wherein the comparing of the portions of rendered video frames of the video frames corresponding to the valid region comprises a pixel-by-pixel comparison of the portions of the rendered video frames corresponding to the valid regions.

4. The method of claim 3, wherein the generating of the overlay segment based on the stored differences comprises maintaining relative properties of pixels of the stored differences in the overlay segment.

5. The method of claim 4, wherein the relative properties comprise distances to local axes of movement along the estimated touch path, spatial separations between the pixels, and color gradients between the pixels.

6. The method of claim 3, wherein the generating of the overlay segment based on the stored differences comprises shifting pixels of the stored differences to locations along the estimated touch path corresponding to a delay introduced by an application processor.

7. The method of claim 3,
   wherein the estimated touch path is computed based on a subset of the touch events corresponding to a fixed number of frames, and
   wherein the fixed number of frames correspond to a delay introduced by an application processor.

8. The method of claim 1, wherein the combining the video frame with the overlay segment in accordance with the touch events comprises:
   generating a mask based on the touch events, the mask comprising a matrix of numerical values, each of the numerical values identifying an operation to produce the composite video frame,
   wherein positions of the numerical values within the matrix correspond to positions of pixels in the composite video frame.

9. The method of claim 8, further comprising determining, for each pixel in the composite video frame, whether to output a corresponding pixel of the video frame or the overlay segment in accordance with a value in a corresponding position in the mask.

10. The method of claim 8, wherein each of the numerical values of the mask corresponds to one pixel in the composite video frame or corresponds to more than one pixel in the composite video frame.

11. The method of claim 1, wherein the touch events are generated as a result of an interaction between a pointing implement and touch sensor.

12. An accelerator for providing visual feedback to touch input, the accelerator comprising:
   a processor; and
   a memory having instructions stored thereon that, when executed by the processor, cause the processor to perform:
      receiving a plurality of touch events from a touch sensor coupled to a display;
      generating an overlay segment based on the plurality of touch events;
      receiving a video frame of the video frames;
      combining the video frame with the overlay segment in accordance with the touch events to generate a composite video frame; and
      supplying the composite video frame to the display,
      wherein the generating of the overlay segment comprises:
         determining a valid region of the video frames surrounding an estimated touch path;
         comparing portions of rendered video frames of the video frames corresponding to the valid region to determine differences in successive rendered frames of the video frames; and
         generating the overlay segment based on the differences in the successive rendered frames, the overlay segment matching characteristics of the differences in the successive rendered frames.

13. The accelerator of claim 12, wherein the generating of the overlay segment further comprises:
   computing the estimated touch path based on locations of the touch events; and
   storing the differences in a memory buffer, and
   wherein the comparing of the portions of rendered video frames of the video frames corresponding to the valid region comprises a pixel-by-pixel comparison of the portions of the rendered video frames corresponding to the valid regions.

14. The accelerator of claim 13,
   wherein the generating of the overlay segment based on the stored differences comprises maintaining relative properties of pixels of the stored differences in the overlay segment, and
   wherein the relative properties comprise distances to local axes of movement along the estimated touch path, spatial separations between the pixels, and color gradients between the pixels.

15. The accelerator of claim 13, wherein the generating of the overlay segment based on the stored differences comprises shifting pixels of the stored differences to locations along the estimated touch path corresponding to a delay introduced by an application processor.

16. The accelerator of claim 13,
   wherein the estimated touch path is computed based on a subset of the touch events corresponding to a fixed number of frames, and
   wherein the fixed number of frames correspond to a delay introduced by an application processor.

17. The accelerator of claim 12, wherein the combining the video frame with the overlay segment in accordance with the touch events comprises:
   generating a mask based on the touch events, the mask comprising a matrix of numerical values, each of the numerical values identifying an operation to produce the composite video frame,
   wherein positions of the numerical values within the matrix correspond to positions of pixels in the composite video frame.

18. The accelerator of claim 17, further comprising determining, for each pixel in the composite video frame, whether to output a corresponding pixel of the video frame or the overlay segment in accordance with a value in a corresponding position in the mask.

19. A touch input processing device for providing visual feedback to touch input, the touch input processing device comprising:
   a display configured to display video frames;
   a touch sensor coupled to the display and configured to generate a plurality of touch events as a result of an interaction between a pointing implement and the touch sensor;
   a processor; and
   a memory having instructions stored thereon that, when executed by the processor, cause the processor to perform:
      receiving the plurality of touch events from the touch sensor;
      generating an overlay segment based on the plurality of touch events;
      receiving a video frame of the video frames;
      combining the video frame with the overlay segment in accordance with the touch events to generate a composite video frame; and
      supplying the composite video frame to the display,
      wherein the generating of the overlay segment comprises:
         determining a valid region of the video frames surrounding an estimated touch path;
         comparing portions of rendered video frames of the video frames corresponding to the valid region to determine differences in successive rendered frames of the video frames; and
         generating the overlay segment based on the differences in the successive rendered frames, the overlay segment matching characteristics of the differences in the successive rendered frames.

20. The touch input processing device of claim 19, wherein the executed instructions further cause the processor to perform receiving a video frame of the video frames from an application processor external to the touch input processing device.

* * * * *